J. C. STEVENS.
LONG DISTANCE WATER STAGE RECORDER.
APPLICATION FILED DEC. 19, 1914.
1,163,280.
Patented Dec. 7, 1915.
4 SHEETS—SHEET 1.
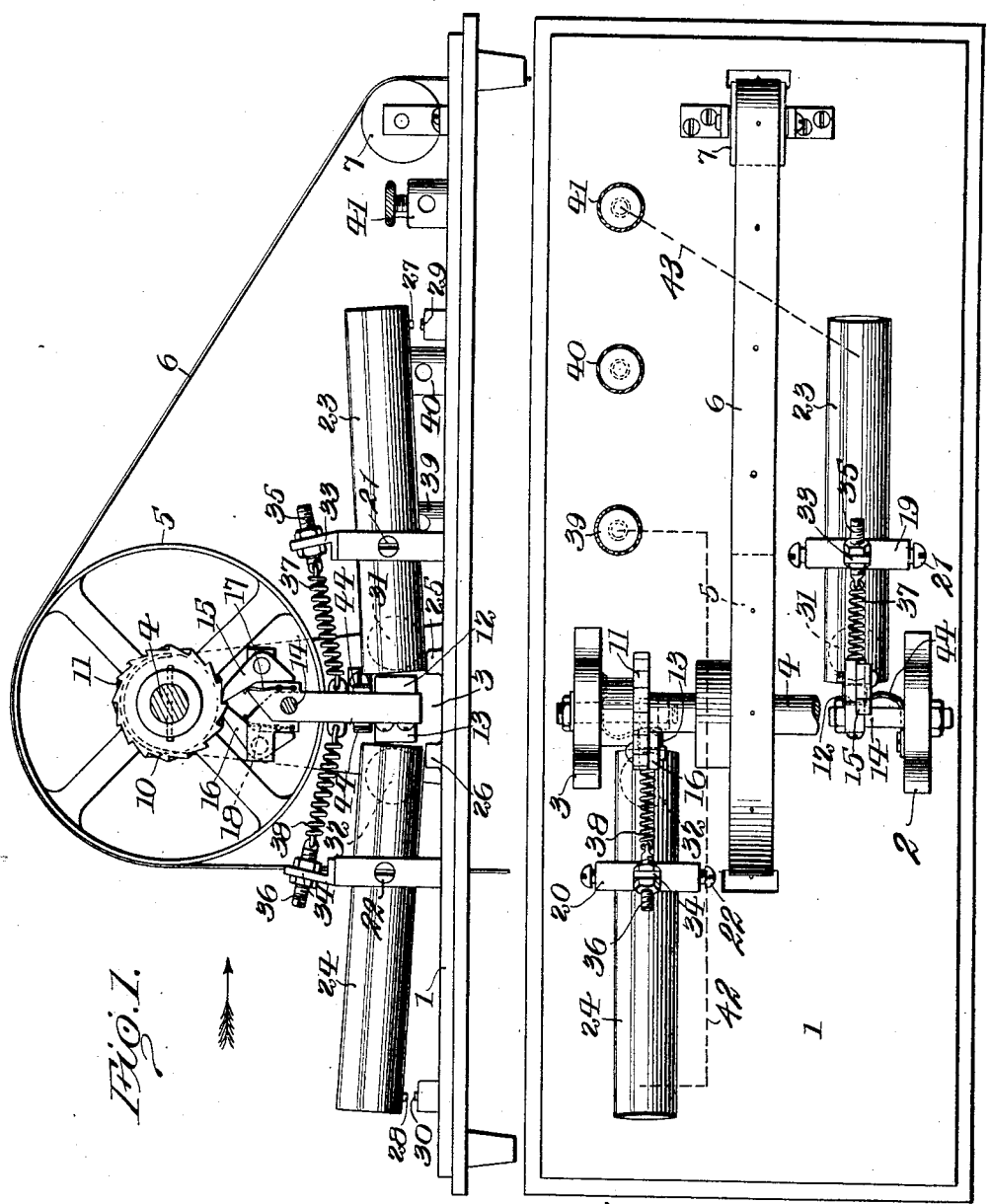

J. C. STEVENS.
LONG DISTANCE WATER STAGE RECORDER.
APPLICATION FILED DEC. 19, 1914.

1,163,280.

Patented Dec. 7, 1915.
4 SHEETS—SHEET 2.

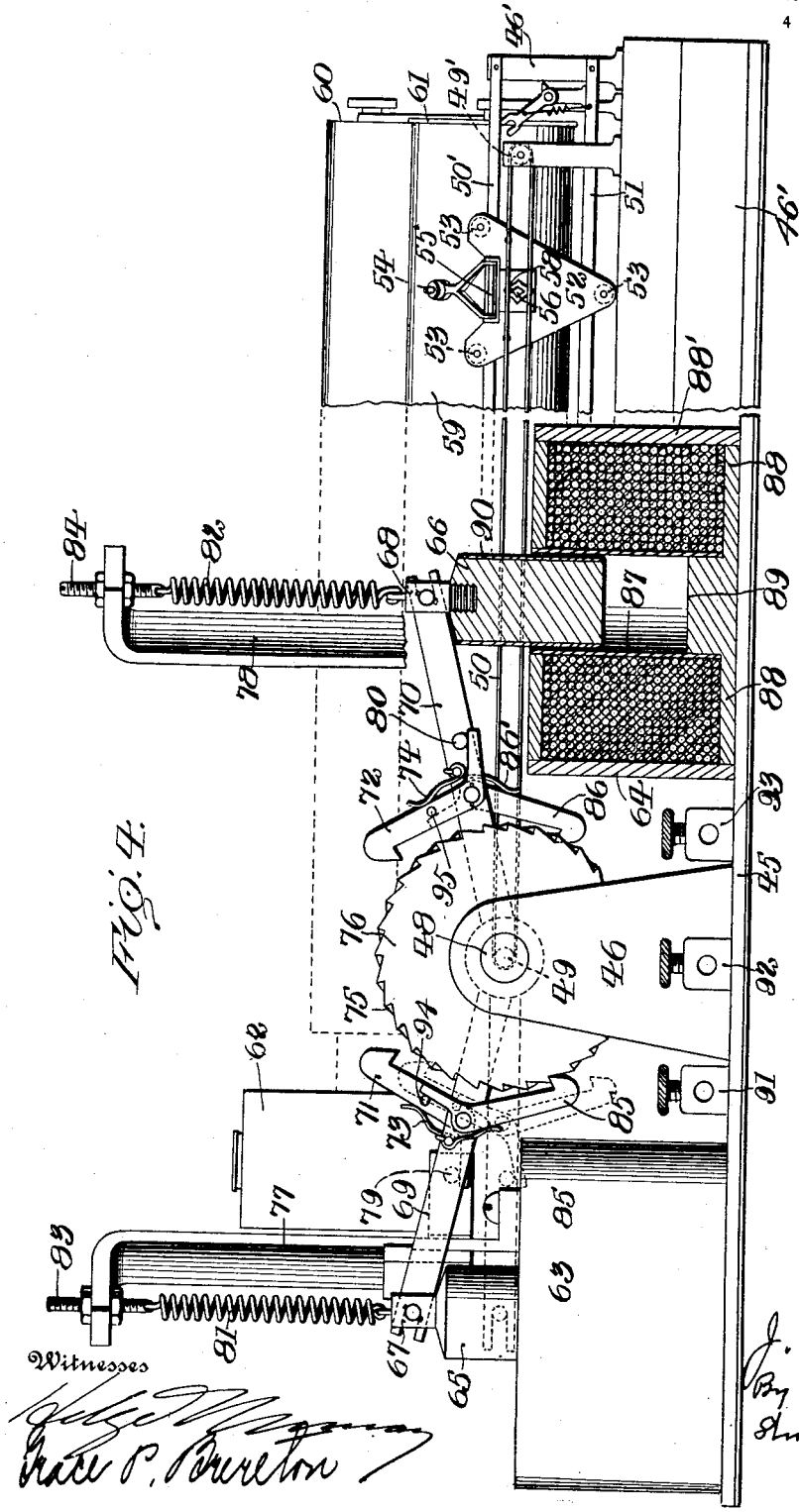

J. C. STEVENS.
LONG DISTANCE WATER STAGE RECORDER.
APPLICATION FILED DEC. 19, 1914.
1,163,280.
Patented Dec. 7, 1915.
4 SHEETS—SHEET 4.
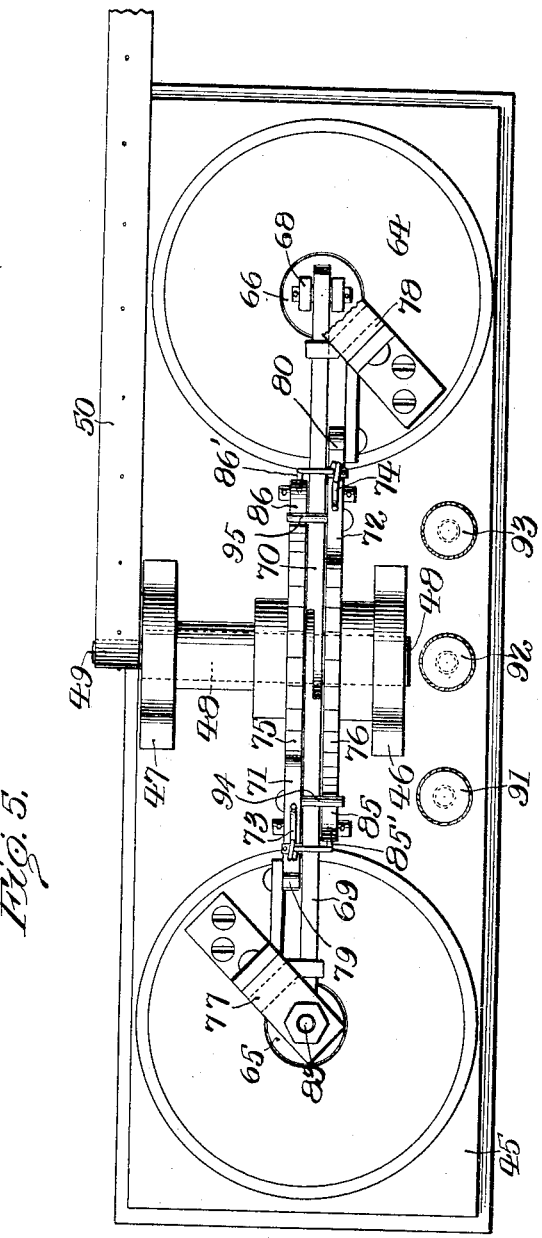
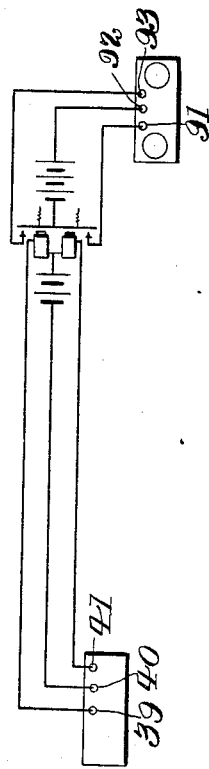
Witnesses
Inventor
John C. Stevens
By Stuteward Mason
Attorneys

UNITED STATES PATENT OFFICE.

JOHN C. STEVENS, OF PORTLAND, OREGON, ASSIGNOR TO LEUPOLD, VOELPEL & CO., A PARTNERSHIP COMPOSED OF FREDERICK LEUPOLD, ADAM J. VOELPEL, AND JOHN C. STEVENS, OF PORTLAND, OREGON.

LONG-DISTANCE WATER-STAGE RECORDER.

1,163,280.      Specification of Letters Patent.      Patented Dec. 7, 1915.

Application filed December 19, 1914. Serial No. 878,119.

*To all whom it may concern:*

Be it known that I, JOHN C. STEVENS, a citizen of the United States, residing at Portland, in the county of Multnomah, State of Oregon, have invented certain new and useful Improvements in Long - Distance Water-Stage Recorders, of which the following is a description, reference being had to the accompanying drawing and to the figures of reference marked thereon.

My invention relates to new and useful improvements in long distance water stage recorders.

An object of the invention is to provide a water stage recorder, whereby the surface levels of liquid in tanks, rivers, lakes or other bodies of water may be recorded or indicated at a distant point at all times, and the said recorder or indicator electrically operated, and which consists of a sender, operated by the rise or fall of the surface of the liquid and a receiver which is adapted to operate the recording mechanism.

Another object of the invention is to provide a simple, cheap and effective electrically operated water stage recorder of this character, having certain details of structure and operation hereinafter more fully set forth.

In the accompanying drawings:—

Figure 3:
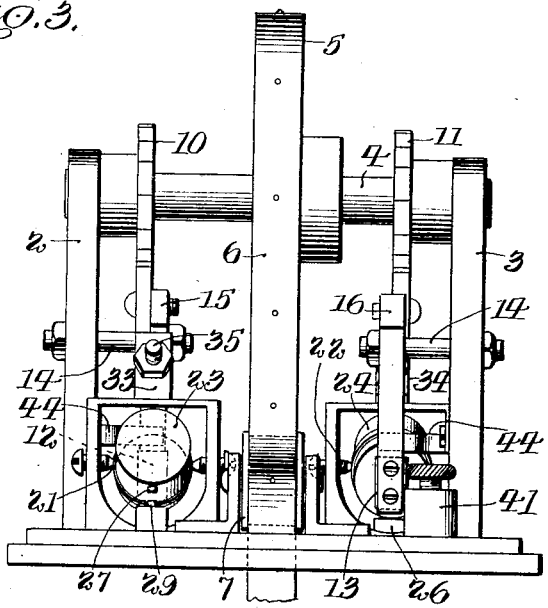
Figure 7:
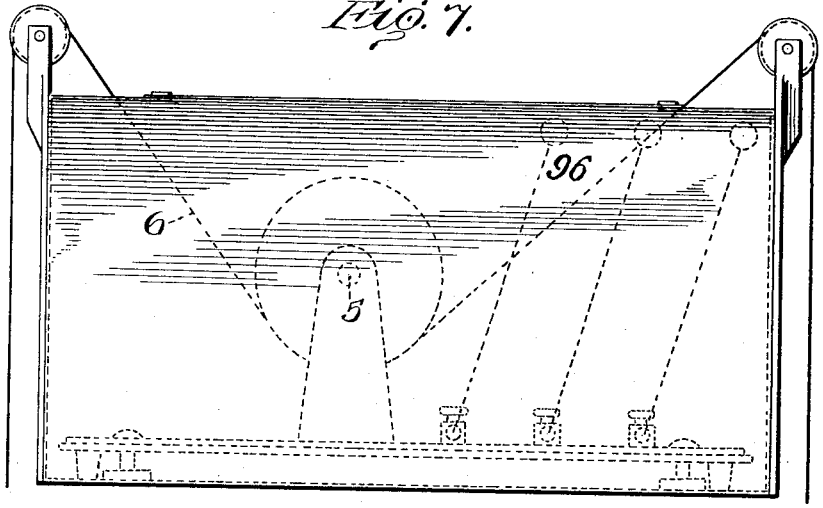

Figure 1 is a side elevation of my improved sender; Fig. 2 is a top plan view of Fig. 1; Fig. 3 is an end view of Fig. 1, looking in the direction of the arrow; Fig. 4 is a side elevation of my improved sender for operating the recorder connected thereto; Fig. 5 is a top plan view of Fig. 4, showing the recording mechanism broken away; Fig. 6 is a diagrammatic view, showing the sender and receiver and the electric wiring connecting the same; and Fig. 7 is a side elevation of an oil container, showing the sender immersed in the oil to prevent the same from being affected by extreme cold weather.

Referring now to the drawings, 1 represents the base of my improved sender, which is located above the body of water or liquid, and having adjacent each side the standards 2 and 3, in which is mounted the shaft 4, carrying the spine wheel 5, over which passes the perforated band 6. One end of the base 1 is provided with a pulley wheel 7, over which the band passes and supports a float resting upon the surface of the body of water, not shown in the drawings. The opposite end of the band 6 has a weight secured thereto below the base 1, which is adapted to hold the band 6 in a tight position upon the outer periphery of the spine wheel 5. The shaft 4, as heretofore stated, is rotatably mounted in the standards 2 and 3 carried by the base, and rigidly secured thereto, on each side of the spine wheel, are ratchet wheels 10 and 11, having their teeth extending in opposite directions. Also secured to the standards 2 and 3 are hammers 12 and 13, the said hammers being pivoted at 14 to said standards. The upper end of each hammer has pivotally secured thereto the pawls 15 and 16, turned in opposite directions and engaging the ratchet teeth of the ratchet wheels 10 and 11. Carried by the hammers and adjacent the pawls are the springs 17 and 18, which normally hold the pawls against the teeth of their respective ratchet wheel.

The base 1, on each side of the standards 2 and 3, is provided with brackets 19 and 20, upon which are mounted, at 21 and 22, the elongated inclined tubes 23 and 24. The inner ends of the tubes rest upon the felt pads 25 and 26, while their upper and outer ends are provided with contact points 27 and 28 adapted to engage the platinum contact points 29 and 30 carried by the base 1. These platinum contacts 29 and 30 are insulated from the base and are in an electric circuit, which will be later described. The tubes 23 and 24 are hermetically sealed and have therein the balls 31 and 32, which are of less diameter than that of the tubes, so that they will freely move from one end of the tubes to the other. The inner lower ends of the hermetically sealed tubes are of thin metal forming diaphragms against which the balls normally rest.

Carried by the supports 19 and 20 are upwardly extending ears 33 and 34, through which are screwed the bolts 35 and 36 and having attached to their inner ends the springs 37 and 38. These springs have their inner ends attached to the hammers 12 and 13 and tend to normally hold the hammers outwardly against the ends of the tubes 23 and 24.

When the water rises, the float rises and the weight, carried by the opposite end of the band 6, turns the spine wheel 5 in a counter-clockwise direction which causes the ratchet wheel 11 to revolve and through the medium of the pawl 15 causes the hammer 12 to move to the left on its pivot 14 until the pawl 15 is released. The spring 37 draws the hammer 12 to the right causing it to strike against the diaphragm of the tube 24, giving impact to the ball and causing it to travel up the inclined tube past its pivotal connection 22. As soon as the ball has passed its pivotal connection, the tube tips slightly, causing the contact point 28 to engage the platinum point 30, thereby completing an electric circuit, which operates a receiver at a distant point and the receiver in turn operates the recording mechanism. If the water falls the float travels downwardy with the fall of the water and causes the spine wheel 5 to travel in a clockwise direction which causes the hammer 13 to move to the right, through the medium of a ratchet 10, until the said hammer is released by the pawl when the spring 37 will cause the said hammer to strike the diaphragm at the lower end of the tube 23 and at the same time give impact to the ball and cause it to travel upwardly until it has passed its pivotal connection 22 with the support. The ball travels up the tube 23 until it passes the pivot thereof, when the tube tilts and the contact is formed. The tubes at all times assume an inclined position with the outer ends higher than the inner ends. The ball rolls until it reaches the end of the tube when it will return by gravity until it reaches the pivotal point of the tube and its outer end is raised and the circuit is broken and held open by the weight of the ball. A contact is thus formed between the platinum points 27 and 29 completing a circuit and causing the receiver to operate in a reverse direction for operating the recorder and recording the fall of water in the tank. During this last-mentioned operation, the pawl 15 merely slips a tooth without moving the hammer 12. Thus whenever the water rises a given amount, one electric circuit is closed and when the water falls the same amount another electric circuit is closed.

The base 1 is provided with three binding posts 39, 40 and 41. The binding post 39 is connected to the insulated platinum point 30 by means of the wire 42. The binding post 41 is connected to the insulated platinum point 29 by means of the wire 43, and the binding post 40 is in direct connection with the base and with which the tubes 23 and 24 are also in electrical contact, whereby the circuit is completed.

The hammer when at rest is held by the spring stop 44, which does not permit the hammer to touch the diaphragm of the tube, except when the blow is struck, thus avoiding any interference with the tipping of the tubes. In the manner described an electrical contact of about one-second's duration is secured. A prolonged contact is essential to the operation of the solenoids on the receiver and will be later described.

The receiver consists of a base 45 having the two standards 46 and 47, in which is rotatably mounted the shaft 48, carrying the drive pulley 49, over which the belt 50 passes for operating the recording mechanism, which I will presently describe. The object of the receiver is to cause the wheel 49' to revolve in amount and direction to correspond to the rise and fall of the liquid by following the turning movement of the spine wheel 5 on the sender. At the right of the receiver is a support 46' carrying the standards, upon which are mounted two parallel horizontally arranged tracks 50' and 51, one arranged above the other and upon which is slidably mounted the marking carriage 52. This marking carriage is of triangular form and is provided with small wheels 53 at its three corners which are adapted to travel upon the lower and upper faces of the tracks to reduce the friction of the carriage upon its movements on the track.

The marking mechanism for recording the rise and fall of the level of a body of water consists of a pencil, indicated at 54, which is pivotally mounted at 55, on the carriage and whereby the pencil rests by gravity upon the sheet on the roller carrying the recording sheet. The carriage is provided with a cam 56 which is formed with a thickened portion projecting slightly therefrom. This cam is substantially diamond shaped and receives a pin 58 extending from the endless belt 50. The pulley 49 for driving the belt 50 is moved in either direction according to the rise and fall of the water in the tank or reservoir and thus the pencil records this rise and fall, the pulley being operated by an electrical device hereinafter described.

The recording sheet 59 is carried by suitable rollers 60 and 61 which are operated by a clock mechanism 62, which is fully described in a co-pending application and needs no further description.

The base 45 of the sender carries the supports 46 and 47 and on each side thereof are provided with two solenoids 63 and 64 having soft iron plungers 65 and 66. These plungers carry pins which pass through yokes 67 and 68 which move in slots in the ends of the arms 69 and 70. These arms have their inner ends rotatably mounted upon the shaft 48, to which the drive pulley 49 is attached. The arms 69 and 70 carry pawls 71 and 72, which are pivoted thereto and which are pressed inwardly by springs 73 and 74 in engagement with the two ratchet wheels 75 and 76, rigidly mounted upon the shaft 48 on each side of the arms 69 and 70. The supports 77 and 78 carried by the flanges of the solenoids are provided with stops 79 and 80. The pawls 71 and 72 are so adapted that when the arms 69 and 70 are in their upward position, the lower ends of these pawls engage the stops, lifting them from the teeth of their respective ratchets. The ratchet wheels 75 and 76, as shown in Figs. 4 and 5, have their teeth extending in opposite directions and are fixed to the shaft 48. The normal position of the arms 69 and 70 is upward and are held in this upward position by means of springs 81 and 82 which have their lower ends connected to the arms and their upper ends connected to a screw bolt 83 and 84, which are adjustable in the supports 77 and 78, whereby the tension of the springs 81 and 82 may be increased or decreased.

The arms 69 and 70 carry another set of pawls 85 and 86 which serve to keep the ratchet wheels locked in position except while the arms are descending. These pawls engage the opposite ratchet teeth from those engaged by the pawls 71 and 72, as clearly shown in Fig. 4 of the drawings. In its normal position, the pawl 72 is free from the teeth of the ratchet 76, while the pawl 86 engages the teeth of the ratchet 75 and thus the shaft 48 can not turn in a clockwise direction. The pawl 85 prevents the shaft from turning in a counter-clockwise direction when the arm 69 is up in its normal position. When both the arms are up, therefore, the shaft is locked and there is no possibility of the pulley operating the pencil recording mechanism except when one of the arms is descending.

The solenoid 64 is completely incased in a soft iron envelop. The magnet wires are wound on a hollow brass spool 87, with soft iron flanges 88, and a soft iron pipe 88' is slipped over the coil, the flanges 88 carrying a soft iron stop 89 which enters the center of the spool a short distance. The plunger 87 is soft iron and has a thin brass pipe 90 shrunk thereon to prevent the formation of rust and stop the movement of the plunger. This type of solenoid gives a great tractive power in a small space because a complete magnetic circuit is formed through the soft iron envelop.

The pawls 85 and 86 carry lugs that engage pins 94 and 95 fixed to the pawls 71 and 72 respectively. When the arm 69 descends the beginning of the movement releases the pressure of the pawl 71 against the fixed stop 79 and the spring 73 forces the pawl against the ratchet 75. At the same time the stop 79 pushes against the lug or pawl 85 and causes it to disengage the teeth of the ratchet wheel 76 allowing both ratchets and the shaft to turn. During this movement the pawl 86 does not prevent the ratchet wheel 75 from turning since it is not opposed to its counter-clockwise motion and merely slips one tooth, being held against the teeth by the spring 86'. When the arm 70 descends the action is similar except that the opposite elements are involved. In this manner the pulley 49 is caused to revolve in proportion and in the direction corresponding to the revolution of the float wheel 5.

The base 45 of the receiver is provided with three binding posts 91, 92 and 93, the binding posts 91 and 92 being electrically connected to the inner and outer ends of the wires of the solenoid 63 and the binding posts 92 and 93 electrically connected to the inner and outer ends of the wires of the solenoid 64.

In the operation, let us suppose that the solenoid 64 is in the electric circuit corresponding to the rising stage, thus when the water rises a certain distance, we will say five-hundredths of a foot, for example, a contact is made by the rocking of the tube 24 and an electric current is sent through the solenoid 64. The plunger 65 within the solenoid is pulled downwardly and this carries the arm 70 down with it, causing the pawl 72 to engage the tooth of the ratchet 76 and turn it the space of one tooth. This causes the shaft 48 to revolve in a clockwise direction, which causes the belt 50 to move the carriage pencil to record a rise of five-hundredths of a foot of the water level in the tank. Similarly, in a falling stage of the water, the ratchet 75 will be turned counter-clockwise by the solenoid 63 and the shaft 48 revolves in the opposite direction the space of one tooth to register a fall of five-hundredths of a foot of the water level in the tank.

In order to insure the operation of the solenoids on the receiver, time must be given for the magnetic flux to reach its maximum density, that is, the contact in the circuit must be prolonged. An instantaneous contact would not accomplish the result and for this reason the electric current is closed by the balls and tubes which hold the circuit closed for a short but predetermined period of time. As constructed the electric current as closed by the sender will flow for nearly one second. The length of time the circuit is closed can be varied by lengthening or shortening the tubes in the sender.

In Fig. 6, I have shown a tank 96, which is filled with oil and in which the sender is immersed. The spine wheel 5 has the band 6 passing around the same from the underside and passes upwardly over the pulleys carried by the ends of the tank and to which the float and the weight are attached. By this arrangement, it will be seen that, in extremely cold weather, the formation of frost on the moving parts and contacting parts is prevented and insures of its continued operation.

While I have shown a single recording mechanism, it will be understood that a number of recording mechanisms, using different colored pencils, could be used to record on a single sheet the different levels of several bodies of water.

In Fig. 6 relays are shown interposed in the circuit. This is done to permit uniform winding of all the solenoids no matter what resistance may obtain in the circuits connecting the sending and receiving portions.

Having thus described my invention, what I claim as new and desire to secure by Letters Patent, is:

1. In an apparatus of the character described, the combination with a recording sheet, an electrically operated mechanism for operating the marker in either direction, circuit closures consisting of pivoted tubes having movable weights therein, and a float adapted to operate the weights, in the tube for operating the circuit closures and holding them closed for a predetermined length of time.

2. In an apparatus of the character described, the combination with a recording sheet, a marker for said sheet, an electrically operated mechanism for operating the marker in either direction, circuit closures consisting of pivoted tubes having balls rolling therein, and normally holding the tubes in a position with the circuits open, a float, and means operated by the float for rolling the balls in the tubes and causing them to tilt upon their pivot and closing the circuits and holding the circuits closed for a predetermined length of time.

3. In an apparatus of the character described, the combination with a recording sheet, a marker for said sheet, an electrically operated mechanism for operating the marker in either direction, circuit closures consisting of pivoted tubes, balls within the tubes and rolling therein and normally holding the tubes in a position with the circuits open, a float, a wheel rotated by the float, and hammers operated by the wheel for striking the balls and causing them to roll in the tubes and tilting the same for closing the circuit and holding the circuits closed for a predetermined length of time.

4. In an apparatus of the character described, the combination with a recording sheet, a marker for said sheet, an endless belt for operating said marker, a shaft operating said belt, selenoids operating said shaft in either direction, a circuit closure for controlling the circuit to each solenoid, and a float operating said circuit closures, substantially as shown and described.

5. In an apparatus of the character described, the combination with a recording sheet, a marker for said sheet, an endless belt for operating said marker, a shaft operating said belt, ratchet wheels on said shaft and having their teeth extending in opposite directions, solenoids adjacent the shaft, pawls carried by the solenoids and engaging the ratchet wheels and adapted to move the shaft in either direction, circuit closures controlling the circuit to the solenoids and holding the circuit closures closed for a predetermined time, and a float for operating the circuit closures.

6. In an apparatus of the character described, the combination with a recording sheet, a marker for said sheet, an endless belt operating said marker, a shaft operating said belt, ratchets on said shaft, a solenoid on each side of said shaft, separate levers operated by the solenoids, pawls carried by the levers and adapted to rotate the shaft in opposite directions, an electric circuit connected to the solenoids, circuit closures controlling said circuits and consisting of pivoted tubes having balls rolling therein and normally holding the tubes in a position with the circuits open, a float, a band supporting the float, a wheel over which the band passes, ratchet wheels carried by the wheel, spring pressed hammers pivoted adjacent the tubes, pawls carried by the hammers and engaging the ratchet wheels and adapted to be operated thereby for allowing the hammers to strike the balls and cause them to roll in the tubes for tilting the tubes and closing the circuits for a predetermined length of time.

7. In an apparatus of the character described, the combination with a recording sheet, a marker for said sheet, an electrically operated mechanism for operating the marker in either direction, circuit closures consisting of pivoted members, movable weights carried by the pivoted members and normally holding the members in a position with the circuits open, a float, and means operated by the float for moving the weights on the pivoted members and causing them to tilt upon their pivots and closing the circuits and holding the circuits closed for a predetermined length of time.

8. In an apparatus of the character described, the combination with a recording sheet, a marker for said sheet, an electrically operated mechanism for operating the marker in either direction, circuit closures consisting of pivoted members, movable weights carried by the said members and normally holding the members in a position with the circuits open, a float, a wheel rotated by the float, and means operated by the wheel for moving the weights on the pivoted members and tilting the same for closing the circuits and holding the circuits closed for a predetermined length of time.

9. In an apparatus of the character described, the combination with a recording sheet, a marker for said sheet, an electrically operated mechanism for operating the marker in either direction, circuit closures consisting of pivoted members, weights carried by the members and movable thereon and normally holding the members in a position with the circuits open, a float, a movable member operated by the float, means operated by the movable member for engaging the weights and moving them on the pivoted members for tilting the same and closing the circuits and holding the circuits closed for a predetermined length of time.

10. In an apparatus of the character described, the combination with a recording sheet, a marker for said sheet, an endless belt for operating said marker, a shaft operating said belt, ratchet wheels on said shaft, and having their teeth extending in opposite directions, solenoids adjacent the shaft, pawls carried by the solenoids and engaging the ratchet wheels and adapted to move the shaft in either direction, circuit closures controlling the circuit to the solenoids, and a float for operating the circuit closures.

11. In an apparatus of the character described, the combination with a recording sheet, a marker, an electrically operated mechanism for operating the marker in either direction, pivoted circuit closures, movable weights thereon, and a float adapted to move the weights on the pivoted circuit closures.

12. In an apparatus of the character described, the combination with a recording sheet, a marker for said sheet, intermediately pivoted circuit closures, weights supported by the circuit closures and longitudinally movable thereon, and a float for moving the weights on the circuit closures for holding the circuit closed for a predetermined period of time.

In testimony whereof, I affix my signature in the presence of two witnesses.

JOHN C. STEVENS.

Witnesses:
CHARLES L. STURTEVANT,
GRACE P. BRERETON.

Copies of this patent may be obtained for five cents each, by addressing the "Commissioner of Patents, Washington, D. C."